(12) United States Patent
Shiino et al.

(10) Patent No.: US 7,979,988 B2
(45) Date of Patent: Jul. 19, 2011

(54) WORM GEAR UNIT AND METHOD OF PRODUCING SAME

(75) Inventors: Kohtaro Shiino, Kanagawa (JP); Yusuke Fukuda, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 999 days.

(21) Appl. No.: 11/819,201

(22) Filed: Jun. 26, 2007

(65) Prior Publication Data

US 2009/0000120 A1    Jan. 1, 2009

(51) Int. Cl.
*B21D 53/28* (2006.01)
*F16H 3/08* (2006.01)

(52) U.S. Cl. ............... 29/893.31; 29/893.35; 74/325

(58) Field of Classification Search ............ 29/893.31, 29/893.35, 90.6; 74/425, 443, DIG. 10; 180/444
See application file for complete search history.

(56) References Cited

U.S. PATENT DOCUMENTS

| | | | |
|---|---|---|---|
| 2,089,732 A | | 8/1937 | Christman |
| 2,352,557 A | * | 6/1944 | Miller .......................... 409/31 |
| 4,583,271 A | * | 4/1986 | Diener .......................... 29/90.6 |
| 5,722,295 A | * | 3/1998 | Sakai et al. ...................... 74/443 |
| 6,497,041 B2 | | 12/2002 | Fujita et al. |
| 6,622,814 B2 | | 9/2003 | Kurokawa et al. |
| 6,626,261 B1 | | 9/2003 | Kurokawa et al. |
| 6,976,556 B2 | * | 12/2005 | Shimizu et al. ............... 180/444 |
| 2003/0167813 A1 | | 9/2003 | Shinbutsu et al. |

FOREIGN PATENT DOCUMENTS

| | | |
|---|---|---|
| DE | 855 927 | 11/1952 |
| DE | 101 22 144 A1 | 1/2002 |
| DE | 101 36 249 A1 | 2/2002 |
| GB | 715462 | 9/1954 |
| JP | 4-56250 U | 5/1992 |
| JP | 2006-057778 A | 3/2006 |

* cited by examiner

*Primary Examiner* — David P Bryant
*Assistant Examiner* — Alexander P Taousakis
(74) *Attorney, Agent, or Firm* — Foley & Lardner LLP

(57) ABSTRACT

By finding a range of an allowable error of maximum meshing position of a worm shaft in an axial direction relative to a worm wheel, that is higher than that of a worm shaft of a conventional worm gear unit, a worm gear unit of the present invention is provided.

5 Claims, 13 Drawing Sheets

HEAT TREATMENT (HARDENING BY CARBURIZATION)

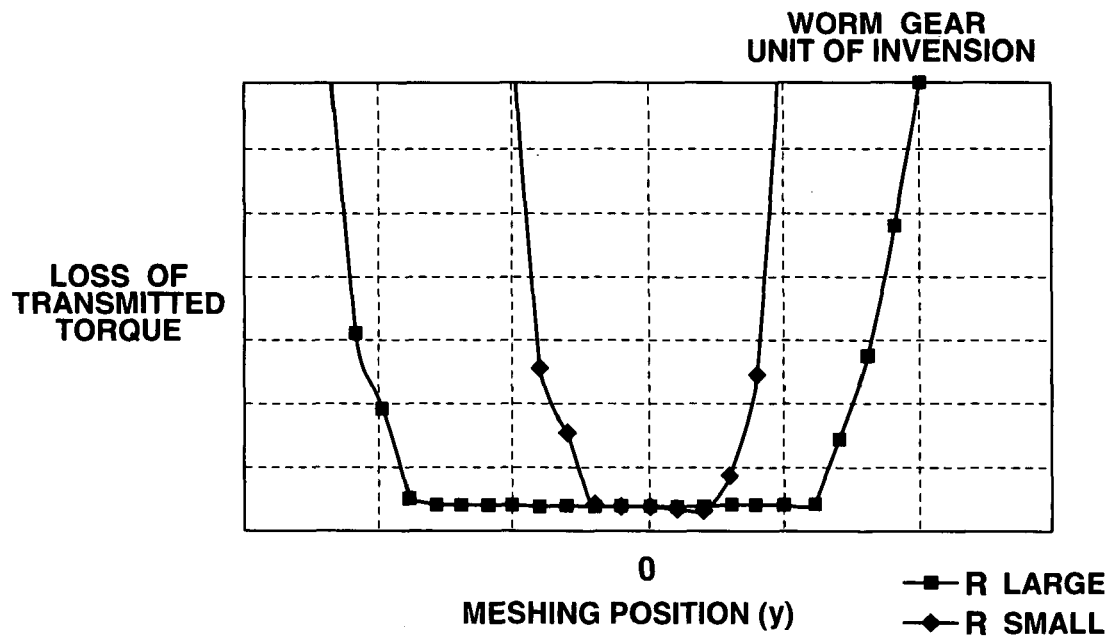
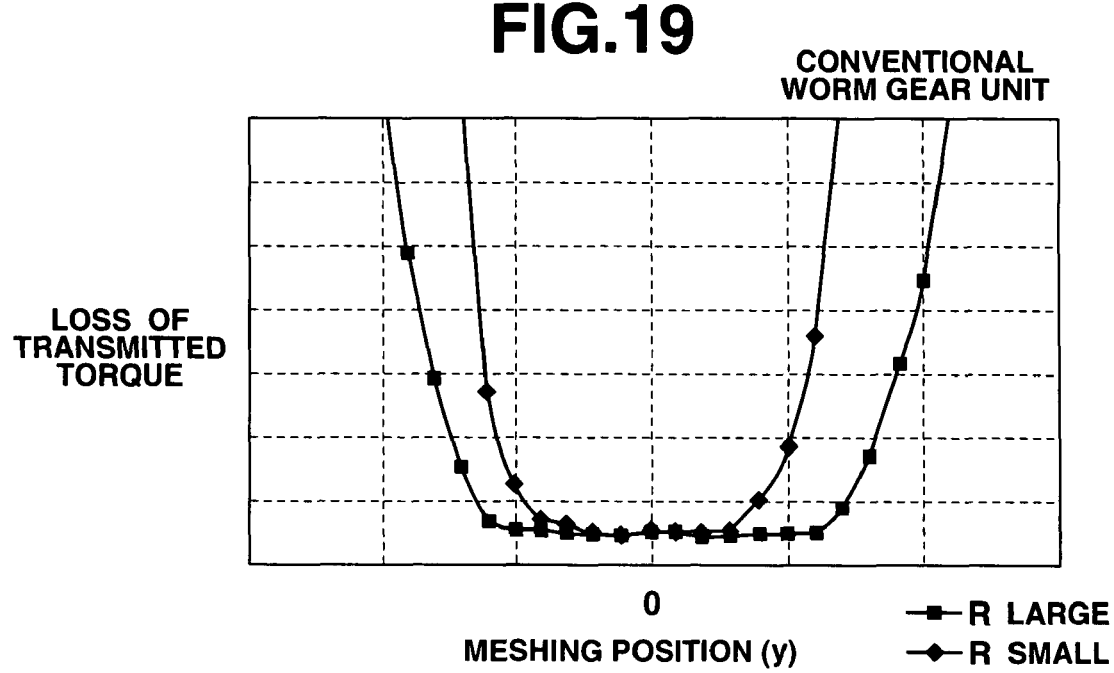

WORM GEAR UNIT AND METHOD OF PRODUCING SAME

BACKGROUND OF INVENTION

1. Field of the Invention

The present invention relates in general to a worm gear unit that includes mutually meshed worm shaft and worm wheel and a method of producing the same, and more particularly a Niemann type worm gear unit and a method of producing the same. The Niemann type worm gear unit comprises a Niemann type worm shaft and a Niemann type worm wheel.

2. Description of the Related Art

Various worm gear units have been hitherto proposed and put into practical use particularly in the field of motor vehicles. The worm gear unit is sometimes called just "worm gear".

One of them is disclosed in Japanese Laid-open Utility Model Application (Jikkaihei) 4-56250. The worm gear unit shown in the publication is of a Niemann type that comprises a Niemann type worm shaft and a Niemann type worm wheel which are operatively engaged or meshed when in use. The worm shaft and worm wheel of such type have arc-shaped continuous ribs (or helical tooth ridge) and arc-shaped teeth respectively. Due to the nature of such Niemann type, the continuous ribs and teeth of the worm gear unit have a larger face width, and thus, the continuous ribs and teeth of the Niemann type worm gear unit can have an increased mechanical strength.

SUMMARY OF THE INVENTION

However, the worm shaft and worm wheel of such Niemann type are complicated in construction and shape, and thus, production of such shaft and wheel needs a highly advanced thread cutting technique, which has thus brought about costly products of the worm gear units.

It is therefore an object of the present invention to provide a worm gear unit of Niemann type, which exhibits a satisfied mechanical strength and can be produced without need of a highly advanced thread cutting technique.

It is another object of the present invention to provide a method for producing such worm gear unit.

In accordance with a first object of the present invention, there is provided a worm gear unit which comprises a worm wheel having equally spaced teeth therearound, each tooth of the worm wheel having at each side a roundly convex outer surface, each groove defined by two neighboring teeth of the worm wheel having a curved bottom that has a first radius of curvature; and a worm shaft having a helical tooth ridge that has at each side a roundly concave outer surface, the helical tooth ridge being meshed with the teeth of the worm wheel and having a second radius of curvature that is smaller than the first radius of curvature, wherein a meshed engagement between each tooth of the worm wheel and the helical tooth ridge of the worm shaft is represented by a first characteristic line described in a characteristic graph that shows a relation between an allowable error of maximum meshing position of the worm shaft in an axial direction relative to the worm wheel and a radius ratio between the first radius of curvature and the second radius of curvature, wherein a meshed engagement between each tooth of a reference worm wheel that and a helical tooth ridge of a reference worm shaft is represented by a second characteristic line described in the characteristic graph, each tooth of the reference worm wheel having at each side a flat outer surface and the helical tooth ridge of the reference worm shaft having at each side a flat outer surface; wherein the first characteristic line and the second characteristic line in the characteristic graph intersect at a given point; and wherein the meshed engagement between each tooth of the worm wheel and the helical tooth ridge of the worm shaft is satisfied by a part of the first characteristic line that is plotted when the radius ratio is equal to or greater than a predetermined value that indicates or corresponds to the intersecting given point of the first and second characteristic lines.

In accordance with a second aspect of the present invention, there is provided a method of producing a worm wheel that is meshed with a worm shaft, the worm shaft having a helical tooth ridge that has at each side a roundly concave outer surface, the method comprising preparing a circular plate blank; and cutting a cylindrical peripheral portion of the circular plate blank to produce thereabout equally spaced teeth each of which has at each side a roundly convex outer surface, the roundly convex outer surface being shaped to be intimately engaged with the roundly concave outer surface of the helical tooth ridge of the worm shaft upon proper coupling between the worm shaft and the worm wheel, wherein a radius of curvature of a curved bottom of each groove defined by two neighboring teeth of the worm wheel is larger than a radius of curvature of the helical tooth ridge of the worm shaft.

In accordance with a third aspect of the present invention, there is provided a method of producing a worm shaft with a helical tooth ridge that has at each side a roundly convex outer surface, the method comprising preparing a cylindrical blank of the worm shaft; cutting an outer surface of the cylindrical blank to form thereabout the helical tooth ridge thereby to produce a semi-finished worm shaft; and applying a surface finish process to the semi-finished worm shaft without applying a heat treatment to the same.

BRIEF DESCRIPTION OF THE DRAWINGS

Other objects and advantages of the present invention will become apparent from the following description when taken in conjunction with the accompanying drawings, in which:

FIG. 18 is a graph showing a relationship between a meshing position and a loss of transmitted torque in case of a worm gear unit of the present invention;

FIG. 19 is a graph similar to FIG. 18, but showing the relationship in case of a conventional worm gear unit.

DETAILED DESCRIPTION OF THE INVENTION

Figure 1:
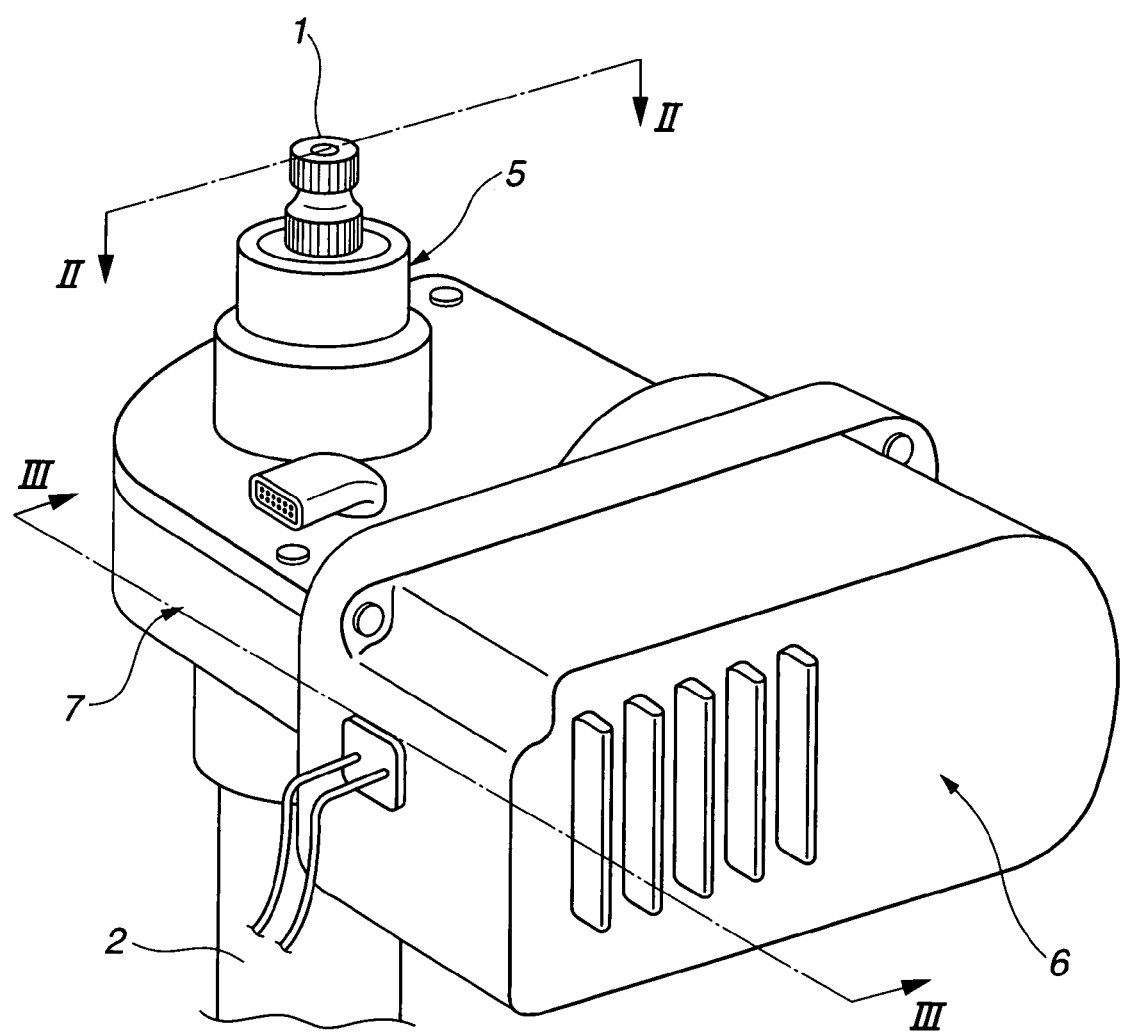
FIG. 1 is a perspective view of an electric power steering device of a motor vehicle to which a worm gear unit of the present invention is practically applied.

In the following, the present invention will be described in detail with the aid of the accompanying drawings.

For ease of understanding, various directional terms, such as, right, left, upper, lower, rightward and the like are used in the following description. However, such terms are to be understood with respect to only the drawing or drawings in which a corresponding part or portion is shown. Throughout the specification, substantially same parts or portions are designated by the same reference numerals.

Figure 2:
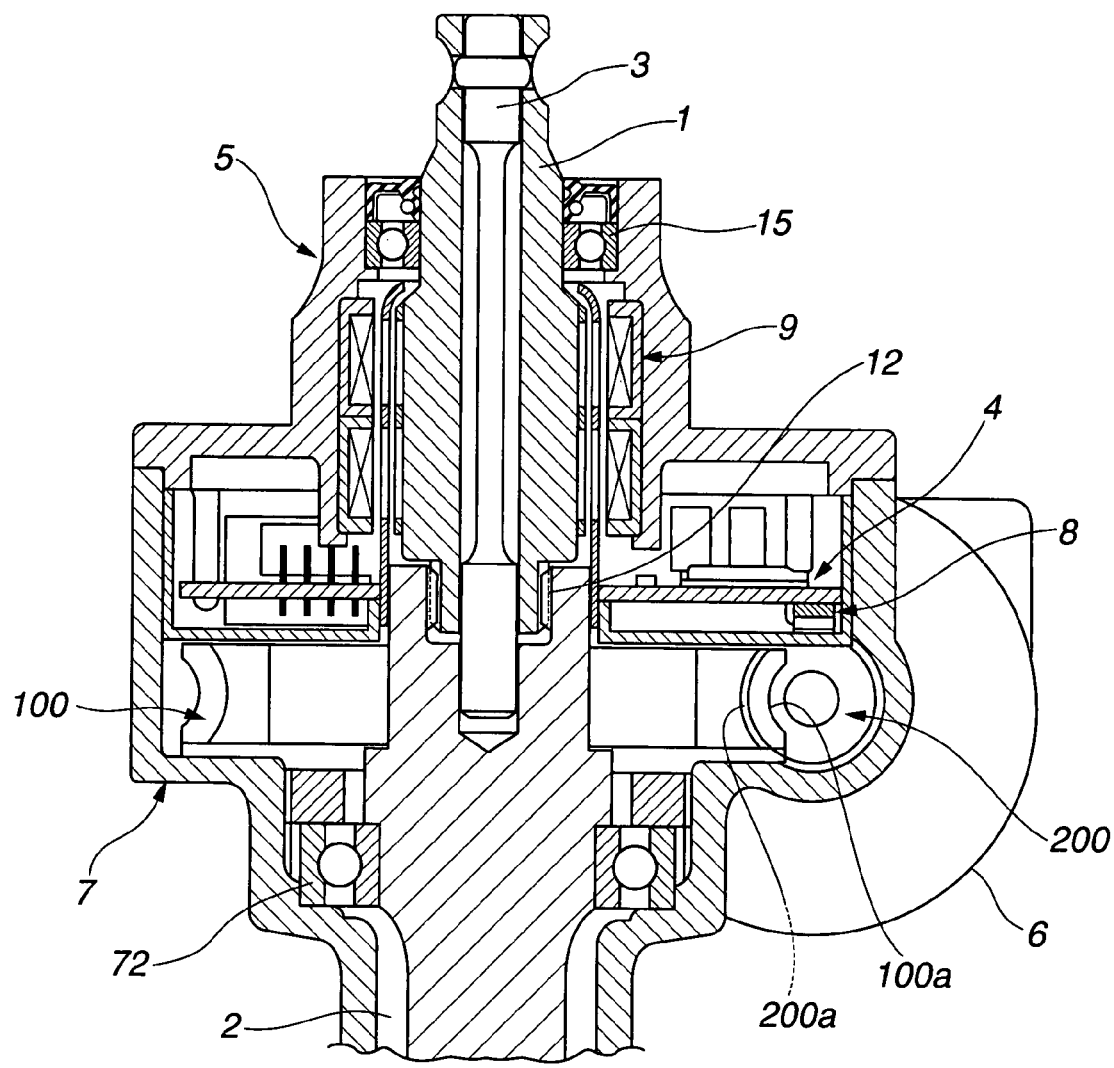
FIG. 2 is a sectional view taken along the line II-II of FIG. 1.
Figure 3:
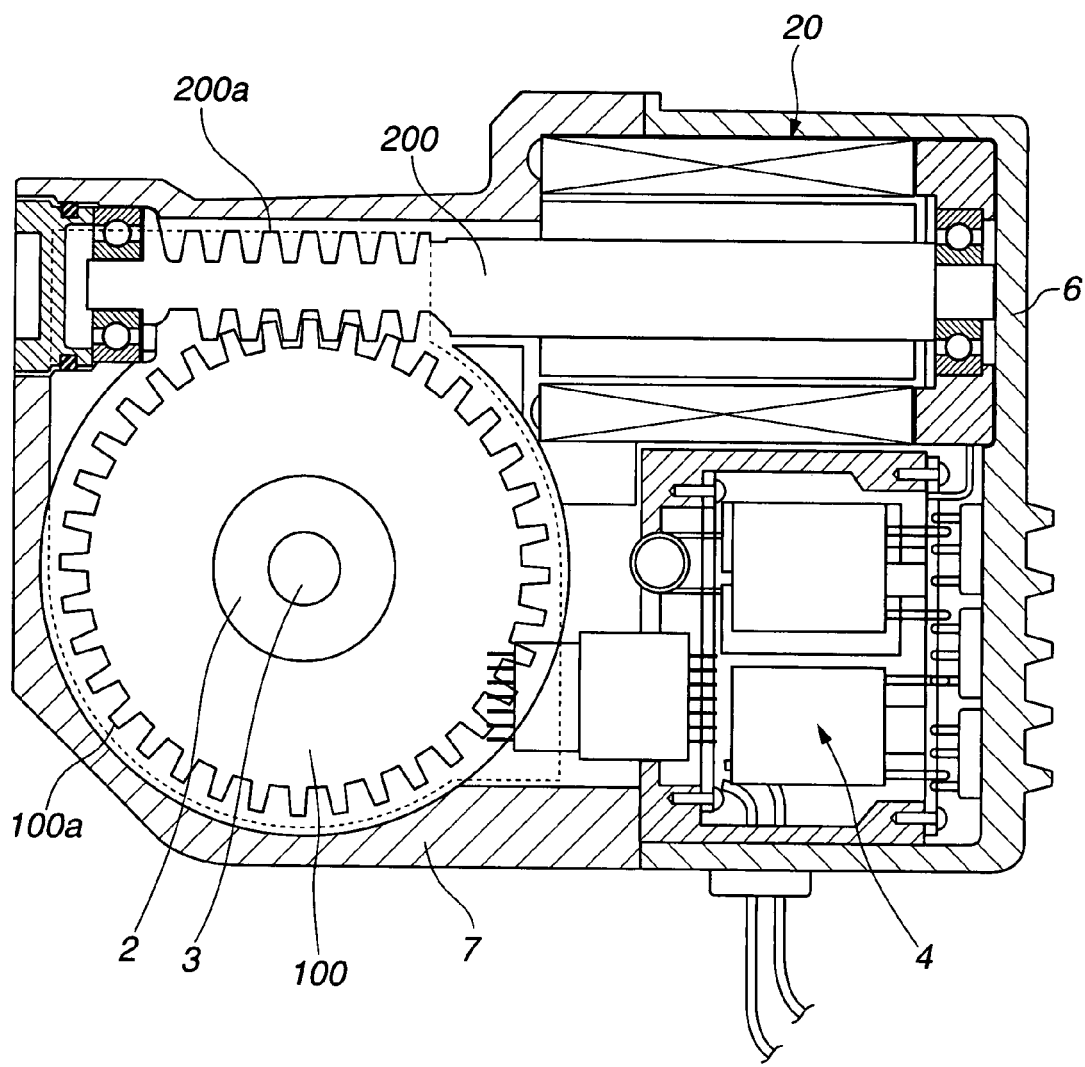
FIG. 3 is a sectional view taken along the line III-III of FIG. 1.

Referring to FIGS. 1 to 3, there is shown an electric power steering device of a motor vehicle in which a worm gear unit of the present invention is practically installed.

For clarifying the feature of the worm gear unit of the invention, the electric power steering device will be briefly described with the aid of FIGS. 1 to 3.

As shown in these drawings, particularly in FIGS. 2 and 3, the electric power steering device comprises a motor housing 6, a worm housing 7, a torque sensor 9 and a motor 20.

As is seen from FIG. 2, a torque sensor housing 5 that houses therein the torque sensor 9 holds therein through a bearing 15 an input shaft 1. Although not shown in the drawing, the input shaft 1 is connected to a steering wheel (not shown) to be driven by the same, more specifically, by a driver who handles the steering wheel. The worm housing 7 that is coupled with the torque sensor housing 5 holds therein through a bearing 72 a pinion shaft 2.

The pinion shaft 2 is coaxially connected to the input shaft 1 through a so-called loose splined connection 12 and a torsion bar 3. It is to be noted that due to the loose splined connection 12, the pinion shaft 2 and the input shaft 1 are permitted to make a slight rotation about the common axis relative to each other against a force produced by the torsion bar 3.

As is seen from FIG. 3, the motor housing 6 coupled with the worm housing 7 receives therein the motor 20 that is a brushless type. As will be seen from this drawing, a worm shaft 200 that is an output shaft of the motor 20 extends across a common axis of the input shaft 1 and pinion shaft 2.

Referring back to FIG. 2, the pinion shaft 2 that is coaxially connected to the input shaft 1 through the torsion bar 3 has a worm wheel 100 tightly mounted thereto. As shown, the worm wheel 100 is received in a stepped bottom portion of the worm housing 7.

As is seen from FIGS. 2 and 3, the worm shaft 200 is formed with a helical tooth ridge 200a (or continuous ribs) that is operatively engaged or meshed with equally spaced teeth 100a of the worm wheel 100.

As is understood from FIG. 2, when applied with a certain rotational force by a driver through the steering wheel, the input shaft 1 is forced to turn about the common axis relative to the pinion shaft 2 while twisting the torsion bar 3. Upon this, the torque sensor 9 senses the torque actually applied to the input shaft 1 and issues a corresponding torque signal.

As shown in FIG. 2, the worm wheel 100 is concentrically and tightly connected to the pinion shaft 2 and operatively engaged with the worm shaft 200 that extends perpendicular to the axis of the pinion shaft 2.

As is seen from FIG. 3, within the motor housing 6, there is installed a control circuit assembly 4 that is equipped with a microcomputer. The control circuit assembly 4 is constructed to control operation of the motor 20 by processing many information signals fed thereto, which are, for example, a signal representing operating condition of an associated motor vehicle, the torque signal from the torque sensor 9, etc.,.

As is seen from FIG. 2, a rotation speed sensor 8 is mounted near the worm shaft 200 to detect a rotation speed of the worm shaft 200, that is, the rotation speed of the motor 20. The rotation speed sensor 8 is of a magnetic type that, for detection of the rotation speed, counts the number of appearance of a given position of the helical tooth ridge 200a of the worm shaft in a given time.

Figure 4:
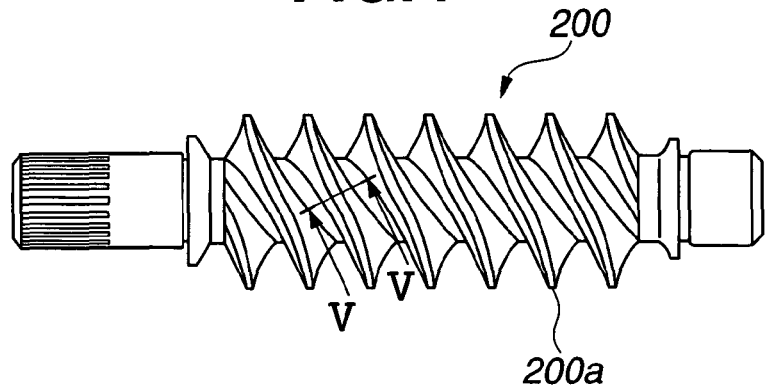
FIG. 4 is a perspective view of a worm shaft of the worm gear unit of the invention installed in the electric power steering device of FIG. 1.

Referring to FIG. 4, there is shown the worm shaft 200 with the helical tooth ridge 200a. The worm shaft 200 is constructed of metal.

It is to be noted that in the present invention, the helical tooth ridge 200a of the worm shaft 200 is of a Niemann type.

Figure 5:
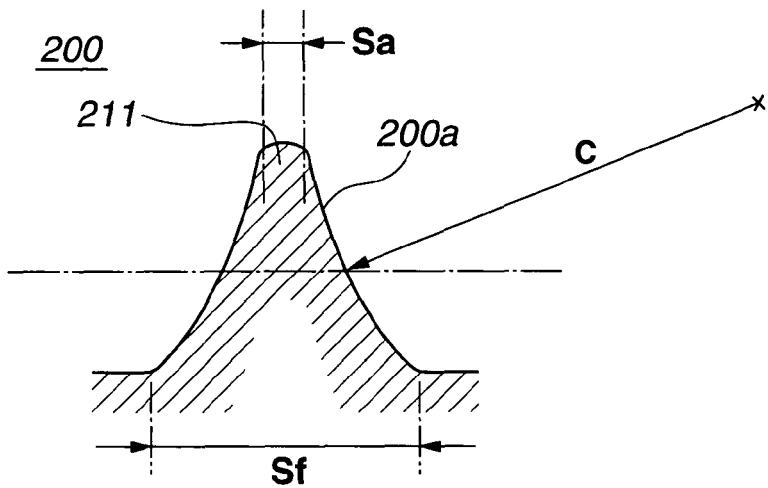
FIG. 5 is an enlarged sectional view of a part of a helical tooth ridge (or continuous ribs) of the worm shaft, that is taken along the line V-V of FIG. 4.

That is, as is seen from FIG. 5 that is an enlarged sectional view of a part of the helical tooth ridge 200a taken along the line V-V of FIG. 4, the helical tooth ridge 200a has at each side a roundly concave outer surface that is defined by a circle having a radius of "C". It is to be noted that as is seen from FIG. 6, in case of a normal type worm shaft 200', a helical tooth ridge 200'b thereof has at each side a flat outer surface.

Figure 6:
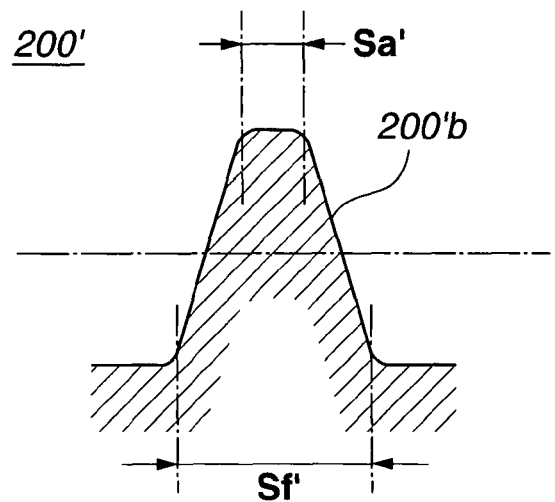
FIG. 6 is a view similar to FIG. 5, but showing an enlarged sectional view of a conventional one.

Accordingly, as will be understood from the drawings of FIGS. 5 and 6, under the same pitch, the width "Sf" of dedendum of the Niemann type helical tooth ridge 200a is larger than the width "Sf'" of dedendum of the normal helical tooth ridge 200b, and the width "Sa" of the addendum 211 of the Niemann type helical tooth ridge 200a is smaller than the width "Sa'" of addendum of the normal helical tooth ridge 200b.

As will be described in detail hereinafter, the surface finish of the worm shaft 200 is made by a deformation processing. With this surface finish processing, the outer surface of the helical tooth ridge 200a is smoothed and thus an outer surface of the teeth 100a of the worm wheel 100 meshed with the worm shaft 200 is protected from having scratches.

Figure 7:
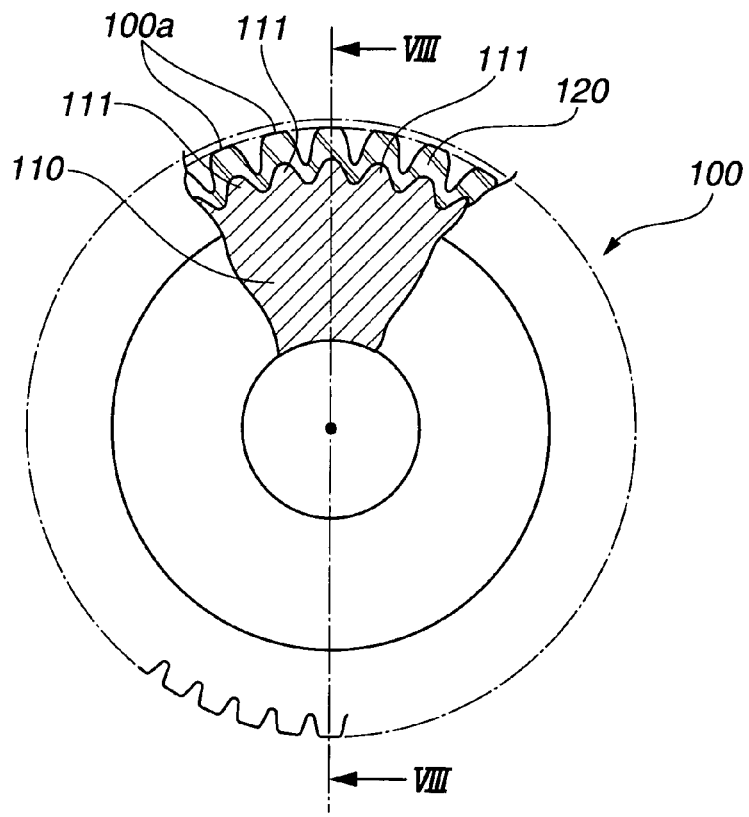
FIG. 7 is a partially cut plan view of a worm wheel of the worm gear unit of the present invention, which is to be meshed with the worm shaft of FIG. 4.

Referring to FIG. 7, there is shown a partially cut plan view of the worm wheel 100.

The worm wheel 100 comprises a toothed annular core 110 of metal that has a center opening (no numeral) for putting therein the pinion shaft 2 (see FIG. 2) and a toothed annular cover 120 of plastic that is concentrically and tightly mounted on the toothed annular core 110, as shown. Preferably, the plastic for the cover 120 is Nylon (tradename) without reinforcing fibers, such as, glass fibers or the like. The toothed annular metal core 110 may be produced by cutting the teeth from a circular metal plate or by using a sintering method.

Figure 8:
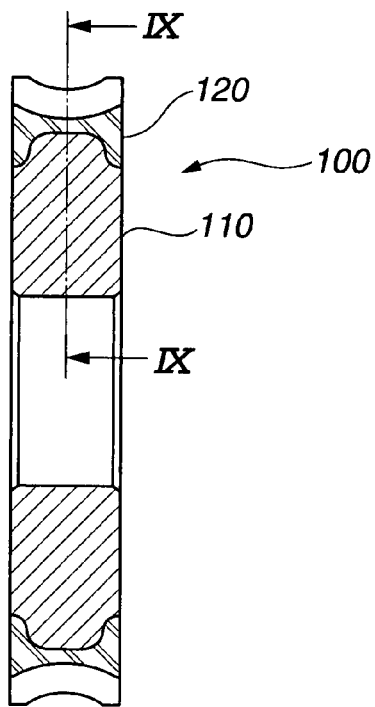
FIG. 8 is a sectional view taken along the line VIII-VIII of FIG. 7.
Figure 9:
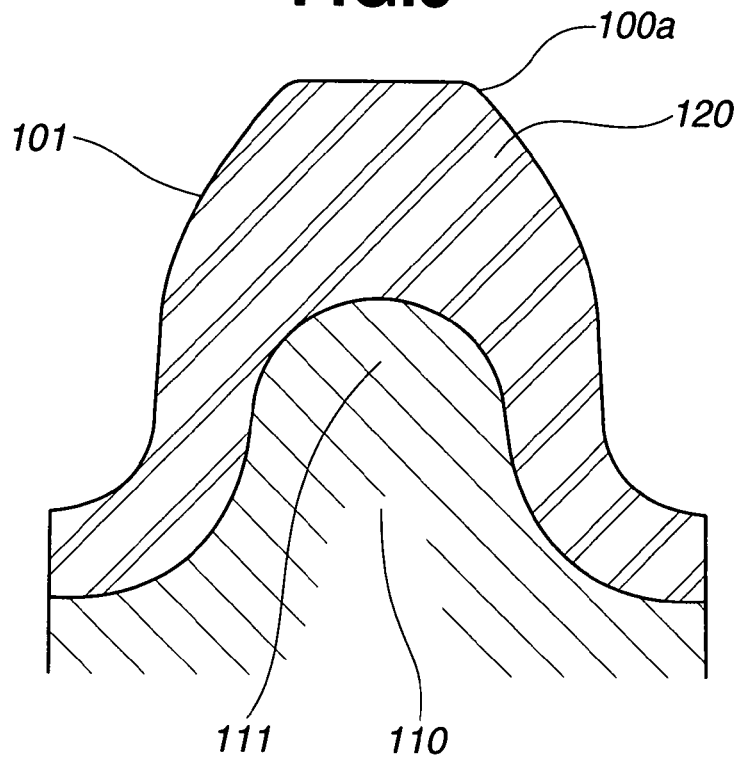
FIG. 9 is an enlarged sectional view taken along the line IX-IX of FIG. 8.

The construction of the worm wheel 100 will much well understood from FIGS. 8 and 9. FIG. 8 is a sectional view taken along the line VIII-VIII of FIG. 7 and FIG. 9 is an enlarged sectional view taken along the line IX-IX of FIG. 8.

Figure 12:
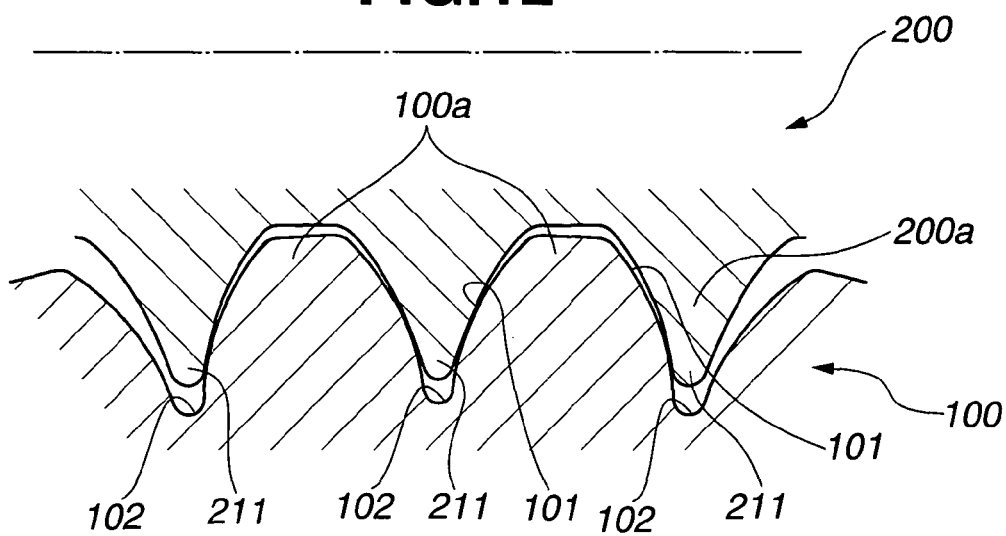
FIG. 12 is an enlarged sectional view showing the detail of a meshed engagement between the worm shaft and the worm wheel of the worm gear unit of the invention.

As is seen from FIG. 9, each tooth of the plastic toothed annular cover 120 of the worm wheel 100 has at each side a roundly convex outer surface 101 that is intimately engageable with the above-mentioned roundly concave outer surface of the Nieman type helical tooth ridge 200a of the worm shaft 200 (see FIG. 12). That is, the worm wheel 100 and the worm shaft 200 constitute a so-called Niemann type worm gear unit.

As is described hereinabove, the toothed annular cover 120 is constructed of Nylon (tradename) without reinforcing fibers, and thus, upon meshed engagement with the worm shaft 200, the plastic toothed annular cover 120 is subjected to elastic deformation and thermal distorsion, which eliminates or at least minimizes undesired backlash of the worm gear unit. Furthermore, since the plastic toothed annular cover 120 contains no reinforcing fibers, the outer surface of the helical tooth ridge 200a of the worm shaft 200 is protected from having scratches.

Furthermore, as is understood from FIG. 9, because of provision of the roundly convex outer surface 101, each tooth of the plastic toothed annular cover 120 of the worm wheel 100 can have a larger thickness, which brings about increased mechanical strength of the worm wheel 100. It is thus to be noted that each tooth of the plastic toothed annular cover 120 can have a satisfied mechanism strength even though it does not contain reinforcing fibers.

Figure 10:
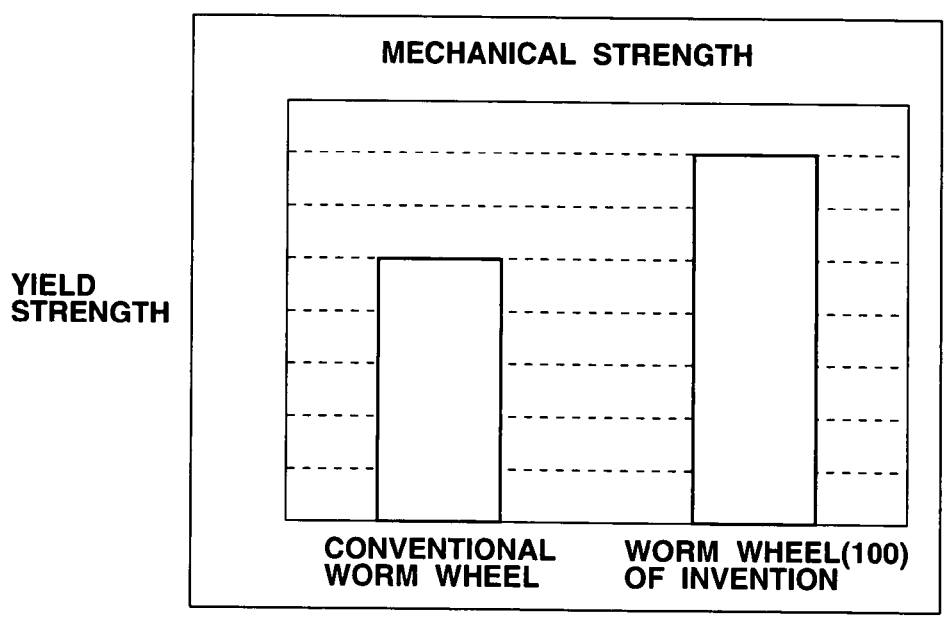
FIG. 10 is a graph simply showing a mechanical strength (viz., yield strength) of the worm wheel of the unit of the present invention and that of a conventional worm gear unit.

This will be well understood from the graph of FIG. 10 in which a mechanical strength (viz., yield strength) of the worm wheel 100 and that of a conventional worm wheel are shown.

As is seen from FIG. 9, each tooth 111 of the toothed annular core 110 of metal is projected into a middle part of the corresponding tooth of the plastic toothed annular cover 120. With this arrangement, any heat produced in the teeth 100a of the plastic toothed annular cover 120 is effectively radiated by the toothed annular core 110 of metal that exhibits excellent thermal conductivity as compared with the plastic cover 120.

In the following, the meshing between the worm wheel 100 and worm shaft 200 will be discussed with reference to FIGS. 11 and 12 for much more clarifying the advantages possessed by the Niemann type worm gear unit of the present invention which comprises the worm wheel 100 and worm shaft 200.

Figure 11:
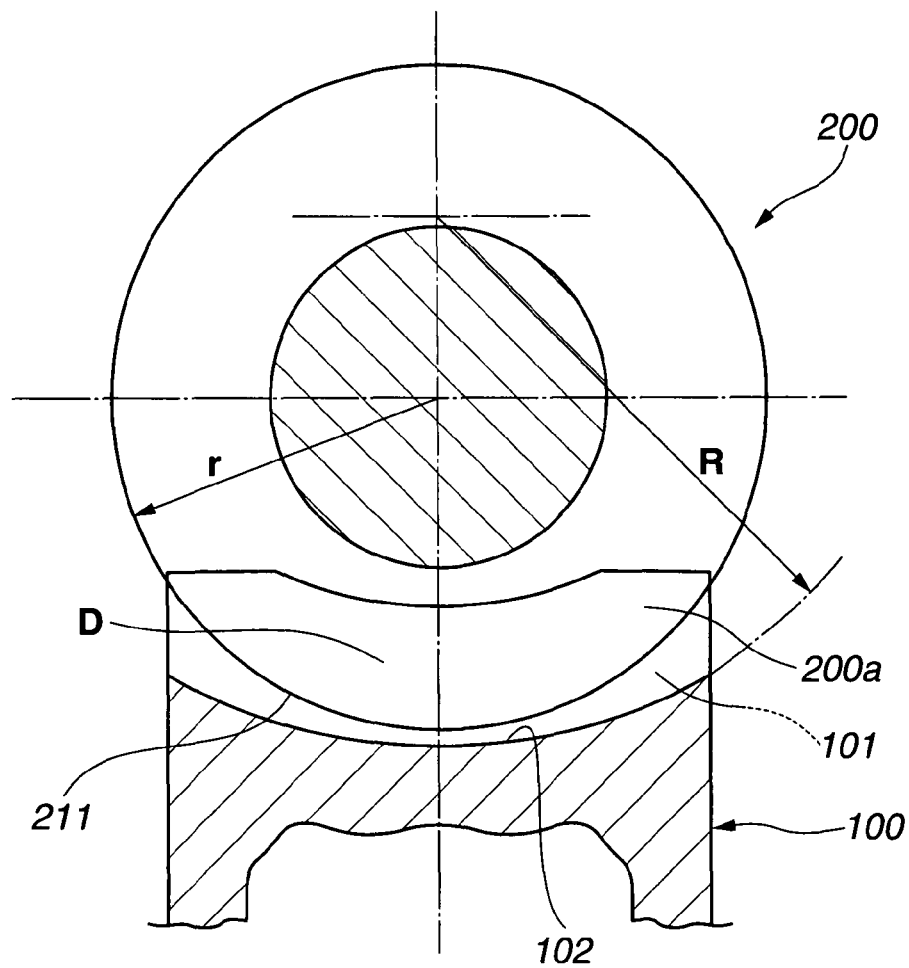
FIG. 11 is an enlarged sectional view showing a condition wherein the worm shaft and worm wheel of the worm gear unit of the invention are operatively engaged.

FIG. 11 is an enlarged sectional view showing a condition wherein the worm shaft 200 and worm wheel 100 of the worm gear unit of the present invention are operatively engaged, and FIG. 12 is an enlarged sectional view showing the detail of the meshed engagement between the worm shaft 200 and the worm wheel 100.

As is understood from these drawings, particularly FIG. 12, when the worm wheel 100 and the worm shaft 200 are properly meshed or assembled, the roundly convex outer surface 101 of each tooth of the worm wheel 100 is intimately and deeply in contact with the roundly concave outer surface of the helical tooth ridge 200a of the worm shaft 200. That is, the contact area defined between each tooth of the worm wheel 100 and the helical tooth ridge 200a of the worm shaft 200 is remarkably larger than that defined between those of a conventional worm gear unit. Thus, a bearing stress produced in case of the worm gear unit according to the invention is quite low as compared with the conventional worm gear unit. Thus, in case of the invention, there is no need of reinforcing the plastic toothed annular cover 120 with reinforcing fibers.

In FIG. 11, denoted by reference "R" is a radius of curvature possessed by each curved groove 102 that is defined between two neighboring teeth 100a of the worm wheel 100, and denoted by reference "r" is a radius of curvature that is possessed by the helical tooth ridge 200a of the worm shaft 200. Denoted by reference "D" is a meshing zone between each tooth of the worm wheel 100 and the helical tooth ridge 200a of the worm shaft 200. As is seen from this drawing, upon proper coupling between the worm wheel 100 and the worm shaft 200, the meshing zone "D" has a radius of curvature of "r".

It is to be noted that in the present invention, the following relationship is established between "R" and "r":

$$R > r \tag{1}$$

Due to a larger radius of curvature "R" possessed by each curved groove 102 of the worm wheel 100, there is no need of using a highly advanced thread cutting technique for producing the worm wheel 100, and thus, the worm wheel 100 can be produced at a lower cost.

As is mentioned hereinafore, the thickness of the addendum 211 of helical tooth ridge 200a of the worm shaft 200 is relatively small (see FIG. 5). Thus, as will be understood from the drawing of FIG. 12, even if the worm shaft 200 is applied with a marked force in a direction to incline relative to the worm wheel 100, a frictional force produced between the addendum 211 of the helical tooth ridge 200a of the worm shaft 200 and the roundly convex outer surface 101 of each tooth of the worm wheel 100 is small, and thus, the torque transmission from the worm shaft 200 to the worm wheel 100 is not substantially affected.

Referring to FIGS. 13A to 13D, there is shown a production process of the worm shaft 200 and that of a conventional worm shaft 200'.

First, the production process of the worm shaft 200 of the invention will be described with the aid of the drawings.

Figure 13A:
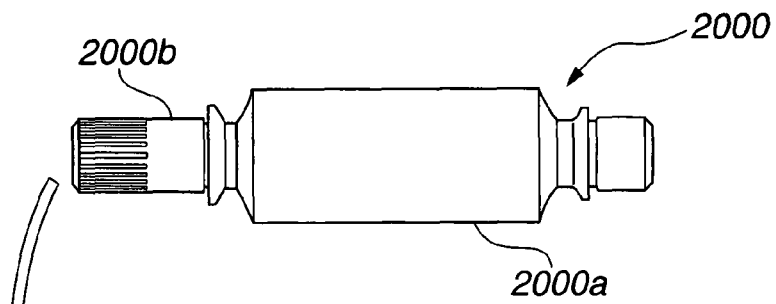
FIGS. 13A to 13D are sketches showing a production process of a worm shaft of the worm gear unit of the invention and that of a conventional worm shaft.
Figure 13B:
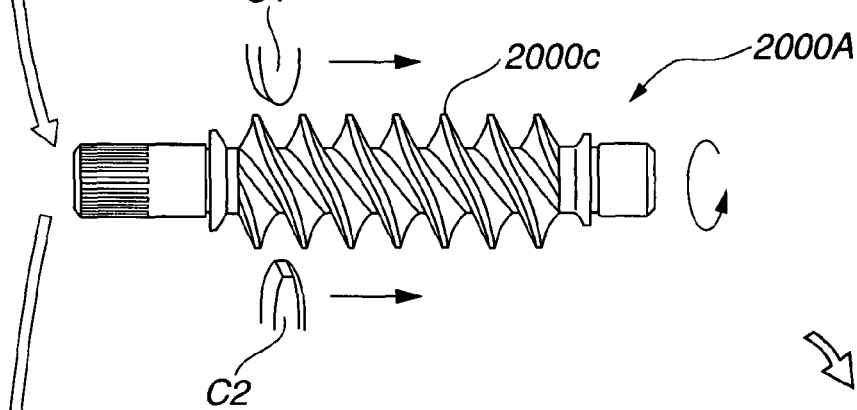

As is shown in FIG. 13A, a semi-blank cylindrical member 2000 of metal is prepared which has a cylindrical major portion 2000a and a splined end portion 2000b. Then, as is shown in FIG. 13B, the major portion 2000a is subjected to a cutting process for providing a helical tooth ridge 2000c thereabout. For this cutting process, two cutting tools C1 and C2 are employed. That is, as is seen from the drawing, for producing the helical tooth ridge 2000c, the semi-blank cylindrical member 2000 is rotated about its axis at a certain speed and then, the cutting tools C1 and C2 whose tips are pressed against the cylindrical major portion 2000a are moved along the axis of the cylindrical member 2000. With this process, a so-called semi-finished worm shaft 2000A is produced.

Figure 13C:
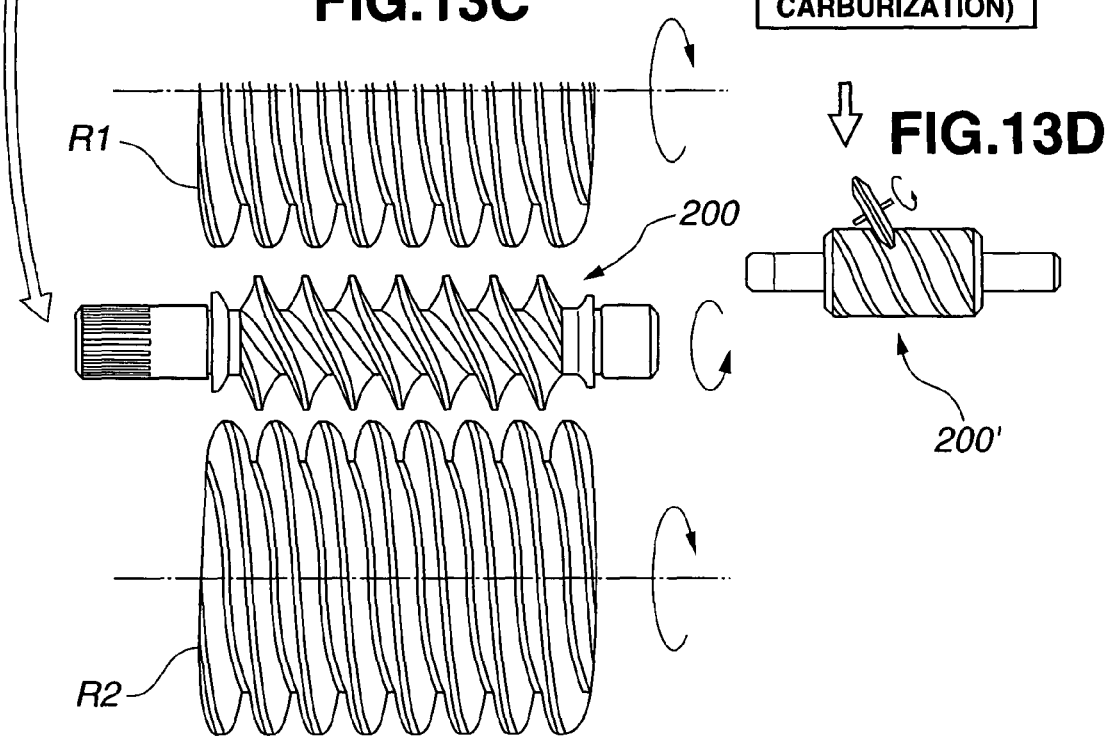

Then, as is seen from FIG. 13C, the semi-finished worm shaft 2000A thus formed with the helical tooth ridge 2000c is subjected to a component rolling finishing process. For this process, two burnishing rollers R1 and R2 are used. That is, a so-called roller burnishing method is used. With this finishing process, a finished product 200 of the worm shaft is provided, as shown.

It is now to be noted that in the present invention, the semi-finished worm shaft 2000A is subjected to the component rolling finishing process instantly without being subjected to a heat treatment.

Figure 13D:
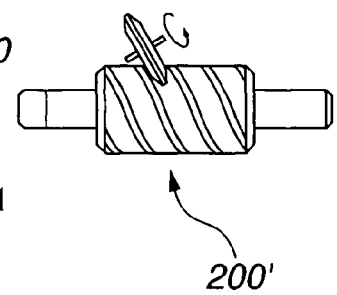

While, as is seen from FIGS. 13B and 13D, in case of production of the conventional worm shaft 200', the semi-finished worm shaft 2000A is subjected to a heat treatment and then subjected to a grinding process.

As has been mentioned hereinabove, in the worm gear unit according to the present invention, the bearing stress produced between the worm wheel 100 and the worm shaft 200 is very low and thus a load applied to the worm shaft 200 is very low. Thus, there is no need of applying the worm shaft 200, more specifically the semi-finished worm shaft 2000A, with the above-mentioned heat treatment. Because of non-need of such heat treatment, a grinding process which is inevitably needed when such heat treatment is employed is not necessary in the present invention.

In the following, the worm gear unit of the present invention will be discussed with respect to the unique construction thereof.

Figure 14:
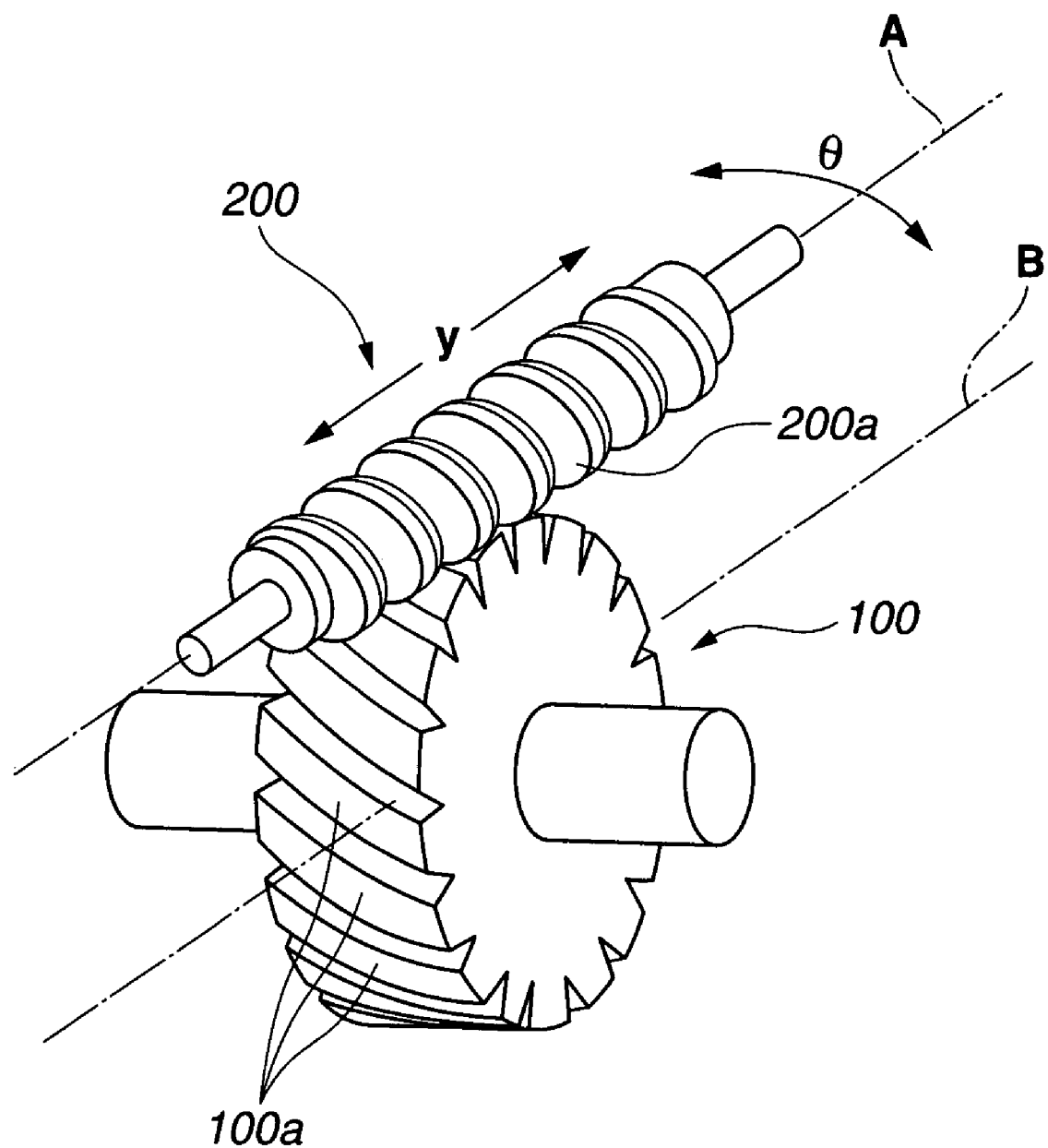
FIG. 14 is a schematically illustrated perspective view of the worm gear unit of the present invention, showing the mutually meshed worm shaft and worm wheel.

FIG. 14 shows schematically a perspective view of the worm gear unit of the invention.

It is to be noted that an angle (or meshing angle) of the axis "A" of the worm shaft 200 relative to a radial direction "B" of the worm wheel 100 is denoted by reference "θ". Thus, when the radial direction "B" of the worm wheel 100 coincides with the axial direction "A" of the worm shaft 200, the angle "θ" shows 0 (zero) degree.

It is further to be noted that the position (which will be called as a meshing position hereinafter) of the worm shaft 200 in the axial direction "A" relative to the worm wheel 100 is denoted by reference "y". Thus, when each tooth 100a of the worm wheel 100 is properly or fully engaged with the helical tooth ridge 200a of the worm shaft 200, the meshing position "y" shows 0 (zero).

For ease of description, in the following, the radius of curvature "R" possessed by each curved groove 102 (see FIG. 11) defined between two neighboring teeth of the worm wheel 100 will be referred to a radius of curvature "R" of teeth of the worm wheel 100, and the radius of curvature "r" possessed by the helical tooth ridge 200a of the worm shaft 200 will be referred to a radius of curvature "r" of the helical tooth ridge of the worm shaft 200.

Figure 15:
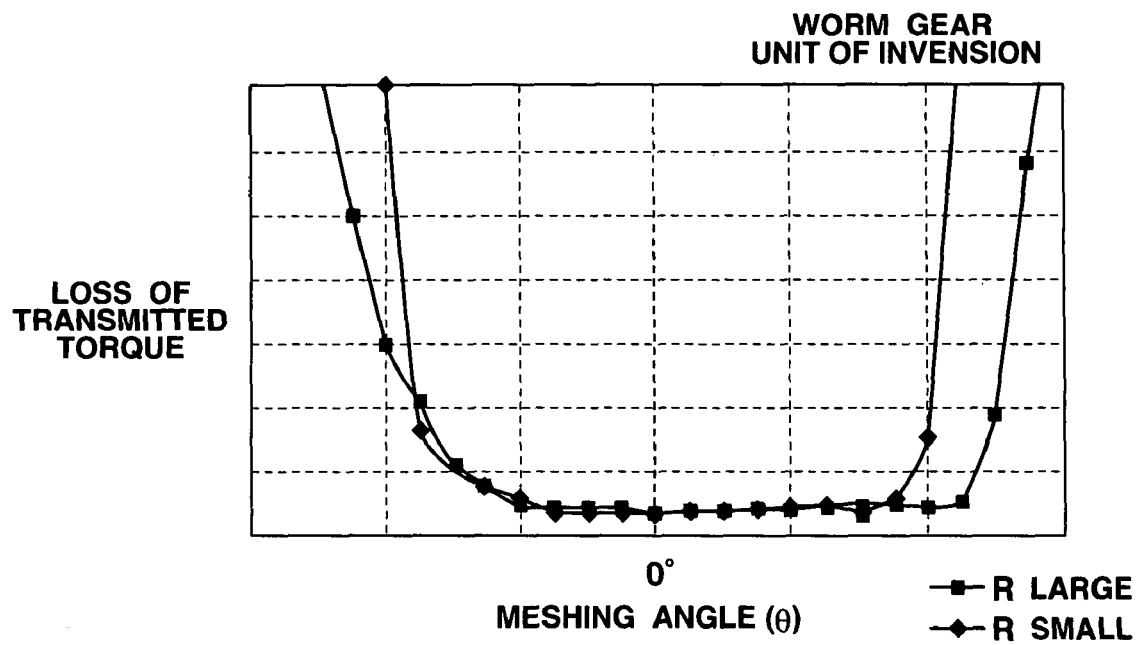
FIG. 15 is a graph showing a relationship between a meshing angle and a loss of transmitted torque in case of a worm gear unit of the present invention.
Figure 16:
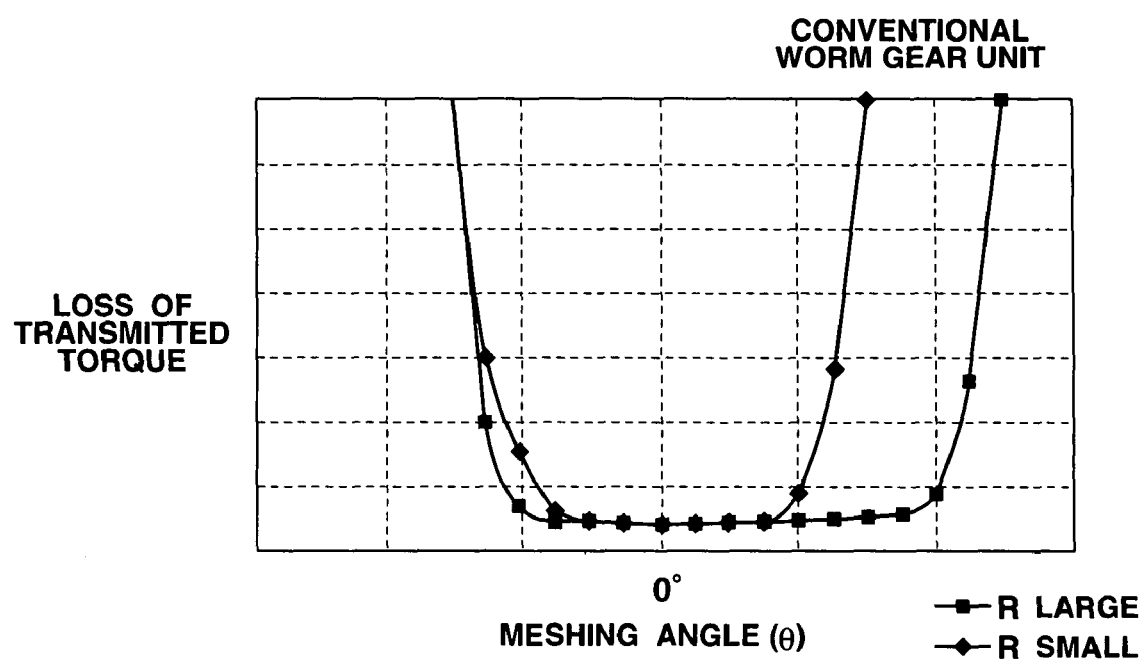
FIG. 16 is a graph similar to FIG. 15, but showing the relationship in case of a conventional worm gear unit.

FIGS. 15 and 16 are graphs respectively showing a loss of transmitted torque in case of the worm gear unit of the present invention and that in case of the conventional worm gear unit with respect to the meshing angle "θ". In each graph, two types of data are shown, one being the data provided when the radius of curvature "R" of teeth of the worm wheel is large and the other being the data provided when the radius of curvature "R" is small.

As is seen from these graphs of FIGS. 15 and 16, in the worm gear unit of the present invention, the range within which the loss of transmitted torque is small is larger than that in the conventional worm gear unit. That is, in case of the present invention, even if a meshing error is somewhat large, the transmitted loss shows only a small loss. The reason of this is as follows. That is, as has been mentioned hereinabove, the helical tooth ridge 200a (see FIG. 5) of the worm shaft 200 has at each side a roundly concave outer surface, and thus, the width "Sa" of the addendum 211 of the helical tooth ridge 200a is small. Thus, as is seen from FIG. 12, upon meshing with the teeth of the worm wheel 100, the addendum 211 of the helical tooth ridge 200a is smoothly and deeply in contact with the roundly convex outer surface 101 of each tooth of the worm wheel 100.

Figure 17:
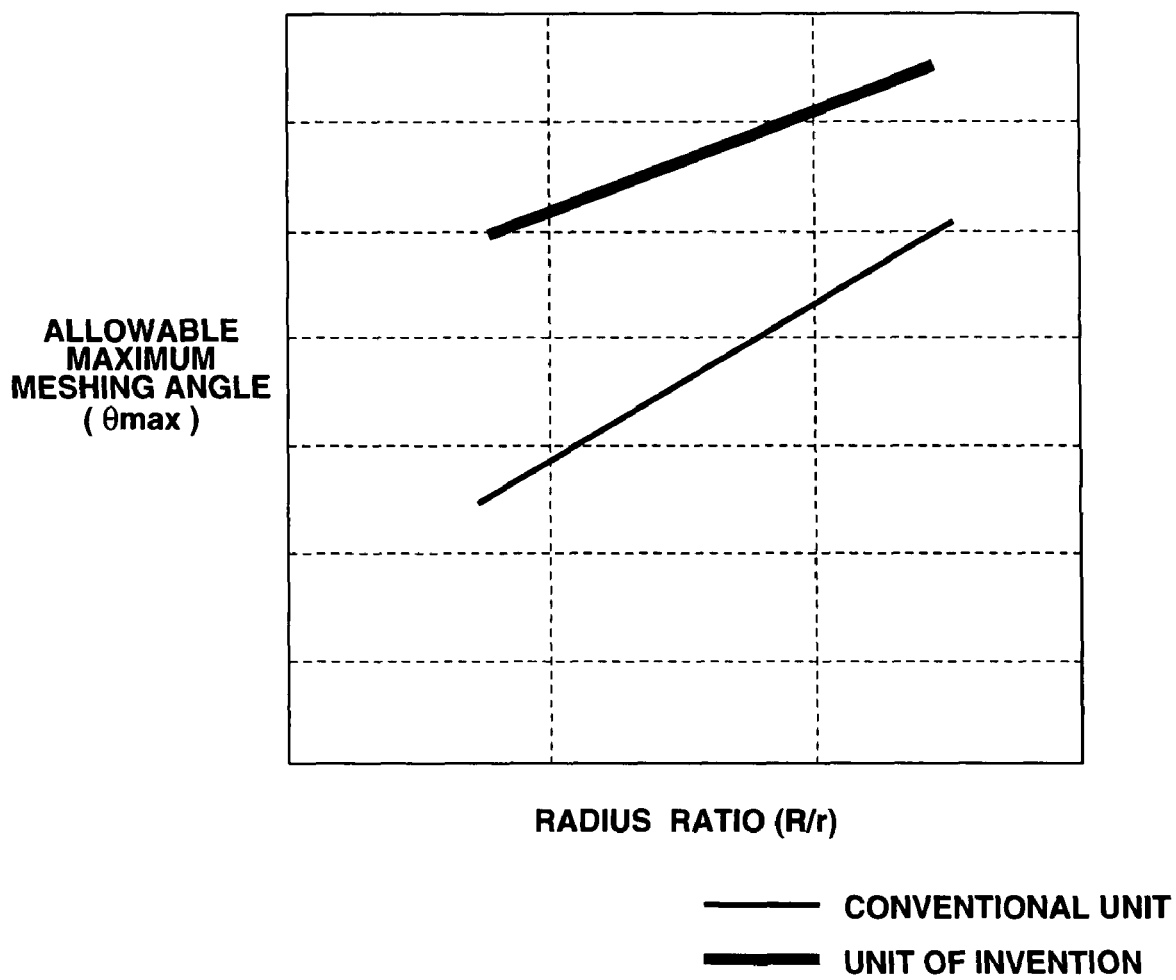
FIG. 17 is a graph showing a relationship between a radius ratio between a radius of curvature "R" of the worm wheel and a radius of curvature "r" of the worm shaft and an allowable maximum meshing angle therebetween.

FIG. 17 is a graph showing an allowable maximum meshing angle "θmax" of the worm gear unit of the invention and that of the conventional worm gear unit with respect to a radius ratio between the radius of curvature "R" of teeth of the worm wheel and the radius of curvature "r" of helical tooth ridge of the worm shaft.

As is seen from the graph, the allowable maximum meshing angle "θmax" of the worm gear unit of the present invention is higher than that of the conventional worm gear unit.

FIGS. 18 and 19 are graphs respectively showing a loss of transmitted torque in case of the worm gear unit of the present invention and that in case of the conventional worm gear unit with respect to the meshing position (y). In each graph, two types of data are shown, one being the data provided when the radius of curvature "R" of teeth of the worm wheel is large and the other being data provided when the radius of curvature "R" is small.

As is seen from these graphs of FIGS. 18 and 19, regarding the meshing position (y), the worm gear unit of the present invention fails to exhibit an excellent advantage in loss of transmitted torque as compared with the conventional worm gear unit. That is, as is seen from the graphs, when the radius of curvature "R" of teeth of the worm wheel is large, the range in which the loss of transmitted toque is small is large in case of the worm gear unit of the invention. However, when the radius of curvature "R" of teeth of the worm wheel is small, the range in which the loss of transmitted torque is small is small in case of the worm gear unit of the invention.

Figure 20:
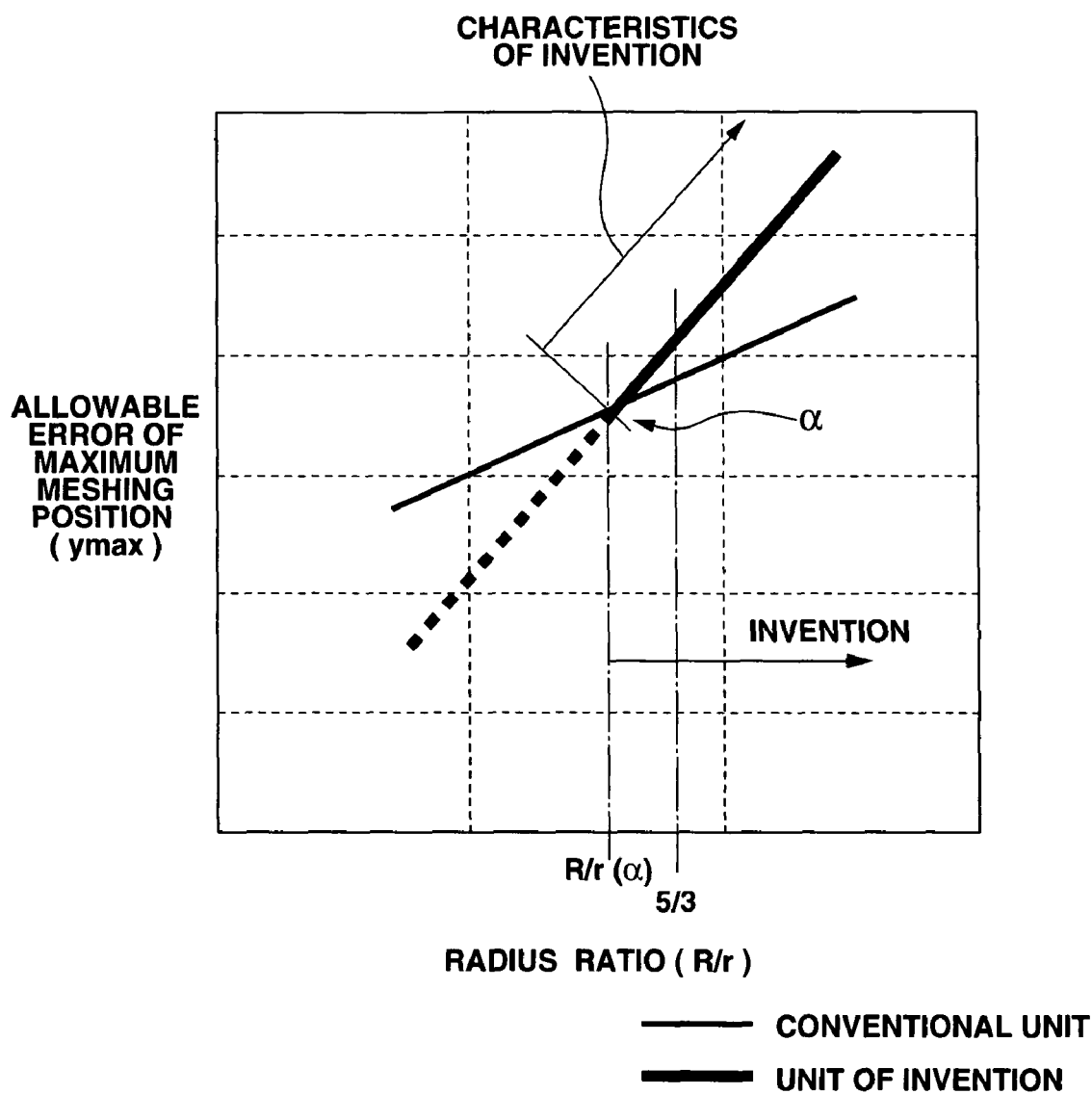
FIG. 20 is a graph showing a relationship between a radius ratio between a radius of curvature "R" of the worm wheel and a radius of curvature "r" of the worm shaft and an allowable error of maximum meshing position.

FIG. 20 is a graph showing an allowable error of maximum meshing position "ymax" of the worm gear unit of the invention and that of the conventional worm gear unit with respect to a radius ratio between the radius of curvature "R" of teeth of the worm wheel and the radius of curvature "r" of the helical tooth ridge of the worm shaft.

As is seen from this graph, in case of the allowable error of maximum meshing position "ymax", the respective characteristic lines of the worm gear unit of the invention and the conventional unit intersect at a point "α" that is indicated by a value of R/r (α) of the radius ratio. As is seen from this graph, in view of a higher allowableness in error of the maximum meshing position "ymax", the worm gear unit according to the present invention should take a radius ratio R/r that is equal to or larger than the value of R/r (α). In one example of the invention, the radius ratio (R/r) is 5/3. As shown in the graph, if the radius ratio is 5/3, the worm gear unit of the invention obtains an allowable error of maximum meshing position (ymax) that is higher than that of the conventional worm gear unit. Preferably, the radius ratio (R/r) is within a range from 5/3 to 2.

If desired, the following modification may be applied to the worm shaft 200. That is, the worm shaft 200 may be formed with two helical tooth ridges which extend parallelly therearound.

The entire contents of Japanese Patent Application 2005-374089 filed Dec. 27, 2006 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A method of producing a worm wheel that is meshed with a worm shaft, the worm shaft having a helical tooth ridge that has at each side a roundly concave outer surface, the method comprising:

preparing a circular plate blank; and cutting a cylindrical peripheral portion of the circular plate blank to produce thereabout equally spaced teeth each of which has at each side a roundly convex outer surface, the roundly convex outer surface being shaped to be intimately engaged with the roundly concave outer surface of the helical tooth ridge of the worm shaft upon proper coupling between the worm shaft and the worm wheel, wherein a radius of curvature of a curved bottom of each groove defined by two neighboring teeth of the worm wheel is larger than a radius of curvature of the helical tooth ridge of the worm shaft, wherein a meshed engagement between each tooth of the worm wheel and the helical tooth ridge of the worm shaft is represented by a first characteristic line that shows a relation between an allowable error of maximum meshing position of the worm shaft in an axial direction relative to the worm wheel and a radius ratio between the first radius of curvature and the second radius of curvature, wherein a meshed engagement between each tooth of a reference worm wheel and a helical tooth ridge of a reference worm shaft is represented by a second characteristic line, each tooth of the reference worm wheel having at each side a flat outer surface and the helical tooth ridge of the reference worm shaft having at each side a flat outer surface;

wherein the first characteristic line and the second characteristic line intersect at a given point; and wherein the meshed engagement between each tooth of the worm wheel and the helical tooth ridge of the worm shaft is satisfied by the first characteristic line, where the radius ratio is equal to or greater than a value that indicates the intersecting given point of the first and second characteristic lines.

2. A method as claimed in claim 1, in which the predetermined value of the radius ratio is about 5/3.

3. A method as claimed in claim 2, in which the predetermined value of the radius ratio is within a range from 5/3 to 2.

4. A method as claimed in claim 1, in which the worm wheel comprises an annular metal core and an annular plastic cover concentrically and tightly mounted on an outer peripheral portion of the annular metal core, the annular plastic cover having thereabout teeth that are meshed with the helical tooth ridge of the worm shaft, the annular metal core being produced by a cutting process.

5. A method as claimed in claim 1, in which the worm wheel comprises an annular metal core and an annular plastic cover concentrically and tightly mounted on an outer peripheral portion of the annular metal core, the annular plastic cover having thereabout teeth that are meshed with the helical tooth ridge of the worm shaft, the annular metal core being produced by a sintering process.

* * * * *